United States Patent [19]

Cepelinski

[11] 4,293,737

[45] Oct. 6, 1981

[54] RINGING DECODER CIRCUIT

[75] Inventor: Jacob Cepelinski, Ottawa, Canada

[73] Assignee: Mitel Corporation, Kanata, Canada

[21] Appl. No.: 100,949

[22] Filed: Dec. 6, 1979

[30] Foreign Application Priority Data

Oct. 18, 1979 [CA] Canada ................................. 337959

[51] Int. Cl.³ ...................... H04M 13/00; H04M 3/02
[52] U.S. Cl. ................................ 179/17 E; 179/84 R; 179/18 HB
[58] Field of Search ................ 179/17 E, 17 R, 27 E, 179/18 FH, 84 R, 84 A, 84 SS, 2 A; 340/167 A, 168 B

[56] References Cited

U.S. PATENT DOCUMENTS

| | | | |
|---|---|---|---|
| 1,942,404 | 1/1934 | Ashbrook et al. | 179/27 E |
| 2,862,058 | 11/1958 | Nilsson et al. | 179/17 E |
| 3,158,837 | 11/1964 | Bodin et al. | 179/84 SS |
| 3,360,777 | 12/1967 | Kolm | 179/2 A |
| 3,689,705 | 9/1972 | Pinede et al. | 179/17 E |
| 4,146,754 | 3/1979 | Rose | 179/2 A |

*Primary Examiner*—Gerald L. Brigance
*Attorney, Agent, or Firm*—Laff, Whitesel & Rockman

[57] ABSTRACT

A telephone system automatic ringing code decoder useful to provide single party ringing on a multi-party telephone line. The decoder counts the number of ring bursts and detects the length of the last ring burst in the first ring burst code sequence and compares it with a preselected code. Upon finding a match, it provides an output on an SEL lead, indicating that further ringing can be applied to a subscriber's set ringer.

14 Claims, 6 Drawing Figures

RINGING DECODER CIRCUIT

BACKGROUND OF THE INVENTION

This invention relates to a decoder circuit, and particularly to a circuit for decoding telephone system coded ringing signals.

Multi-party line telephone system subscriber loops which have a plurality of subscriber's sets connected to the same subscriber's loop normally utilize some form of ringing encoding in order to alert the subscriber that his telephone set is to be answered, or different frequencies of ringing which are filtered at the telephone set and ring only a designated telephone. The present invention is concerned with the type of coded ringing in which series of long and short ring bursts are sent from the central office to all of the telephones connected to a particular subscriber's line. In such systems the subscriber, hearing a particular predesignated code which is unique to his station, recognizes his code and answers the telephone.

When this type of ringing code is sent from the central office along a particular multi-party subscriber's line, all of the telephones ring. It has been found to be annoying and distracting to the subscribers to listen to all of the ringing codes and to mentally decode them while only one of the parties to the multi-party line need answer the call. The attention and resulting mental stress which is required of all of the remaining parties could be eliminated if only the designated telephone were rung, and a subscriber need only listen for the presence of ringing, since he would know that the ringing which he hears is intended only for him.

The present invention is an automatic ringing decoder circuit which is intended to be used to decode ringing codes, thus relieving the subscribers of the stress of mentally decoding them. The invention can be used in conjunction with a switch in series with the portion of the subscriber's line leading connected to a particular subscriber's telephone, to switch the line to that subscriber only in the event the decoded ringing designates that the call is intended for that subscriber. The switch would remain closed unless ringing were received (facilitating outgoing calls), but as soon as ringing is received, the portion of the subscribers line leading to each of the subscribers would open until decoding has been effected. Following decoding, only the subscribers line leading to a particular subscriber would close, allowing further coded ringing signals to ring only the designated subscriber's telephone. That subscriber, hearing his telephone ring, merely answers it without mentally decoding the ringing.

The present invention is a circuit for effecting the ringing decoding. A copending Canadian patent application, Ser. No. 298,723, filed Mar. 13, 1978, entitled PARTYLINE SUBSCRIBER INTERFACE CIRCUIT and invented by Guido Panizzon et al describes ancillary apparatus which can be used in conjunction with the present invention to open and close the respective portions of the subscriber's line connected to the multi-party line, and is incorporated by reference.

Multi-party line systems require the use of revertive ringing, in which the central office is caused to ring all the telephones of a multi-partly line when one subscriber wishes to ring another party of the same multi-party line. This may consist of spaced short bursts of splash ringing.

The telephone switching office normally provides five different types of ringing codes as follows: C1 type comprising a long ring, C2 type comprising two long rings, C3 type comrpising a long ring followed by a short ring, C4 type comprising a long ring followed by two short rings, and C5 type comprising a long ring followed by a short ring, which is followed by a long ring. Ringing voltage, typically 90 volts a.c. at about 20 Hz is applied between the ring or tip lead and ground. Tip party subscriber sets are connected with reversed polariy, to facilitate decoding on ring or tip to ground.

It has been found that various types of central offices, while providing the above-described types of ringing, initiate the ringing bursts at different time sequences relative to each other, and indeed, provide long ring of different time periods. For example, the short ring bursts are standarized at ½ second each, but the long ring bursts can vary between 1 second and 1½ seconds.

Further, the time tolerance of the ring bursts have been found to vary widely, and the transmission line characteristics of the subscribers lines, the longitudinal signal characteristics, the degree of imbalance, etc., all have been found to affect the characteristics of the ringing signal to a substantial degree. In addition, the time between sequences of ring bursts varies between the types of ring bursts noted above.

The above-noted difficulties have made machine decoding heretofore available not completely reliable, and consequently ringing decoding has generally been left to the human subscriber.

The present invention, on the other hand, provides means for reliable decoding of ringing signals, and further provides means for ignoring splash ringing.

BACKGROUND OF THE INVENTION

The present invention is based on methods of decoding which detect factors which are similar to those mentally recognized by a human listener. The timing between ring bursts has been found to decrease, the longer the ringing period within a sequence. This is difficult to discern by a human listener. In the present invention the number of ringing bursts is counted, and the length of the last burst alone is recognized. These two factors are utilized to decode the ringing signal, while the timing between bursts is used to distinguish between the first sequence of ringing bursts which is to be decoded, and the second sequence of ringing bursts which is allowed to pass to the telephone set by external circuitry not part of the present invention.

The present invention, as a result of the decoding, thus provides an indication signal to the external circuitry that a ringing code has been received which is intended for the associated telephone set, and thus that the subscriber's line should be closed. The remaining subscriber's lines, having received a ringing code which does not designate associated subscribers, remain open circuited and ringing is not applied to the their telephone sets.

The invention in general is a ringing decoder circuit for decoding coded ringing signals comprising at least one sequence of bursts of ringing signals, comprising means for counting the total number of bursts in the sequence, means for detecting the length of the final burst in the sequence relative to a predetermined period, and means for indicating the reception of a predetermined code in the event the number of bursts and the relative length of the final burst in the sequence respectively match a predetermined indicated number and relative length.

BRIEF INTRODUCTION TO THE DRAWINGS

A better understanding of the invention will be obtained by reference to the detailed description below, and to the following drawings, in which:

FIG. 1 depicts the timing of different standard ringing codes provided by one type of central telephone switching office, FIG. 2 is a block schematic of the invention in its most general form, FIG. 3 is a more detailed partly schematic and partly block diagram of the preferred form of the invention, FIGS. 4 and 5, when placed together with FIG. 4 above FIG. 5 form a schematic diagram of the preferred form of the invention, and FIG. 6 depicts signal waveforms at various locations in the circuit of the invention.

DETAILED DESCRIPTION OF THE INVENTION

Figure 1:
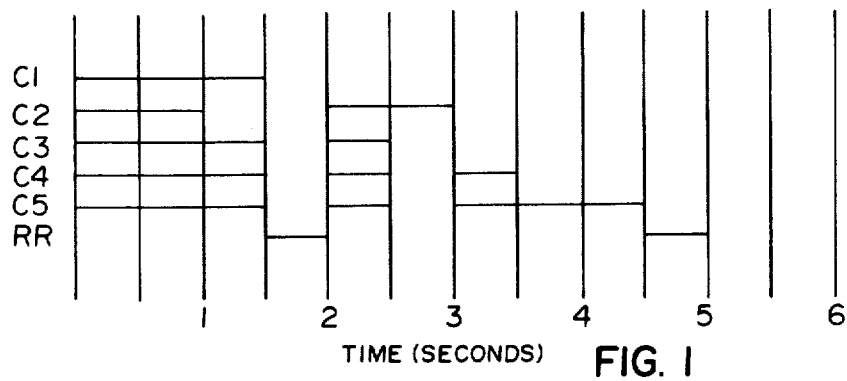

Turning now to FIG. 1, a time graph is shown which depicts a sequence of ringing for each of five standard ringing codes C1-C5, as well as RR for splash ringing. The vertical bars are spaced at half second intervals, showing a total of six seconds which defines the sequence time. The timing chart which has been shown corresponds to the standard codes provided by the SF-1 telephone switching office, which is manufactured by Northern Telecom Limited of Toronto, Canada although a similar scheme is generally followed by most North American switching offices.

For example, the C1 type of code is a single long ring burst 1½ seconds duration. The ring burst is repeated after a wait of 4½ seconds following its termination.

The C2 type of coded ringing is comprised of two long bursts, each 1 second long, separated by a 1 second interval. The sequence is repeated after an interval of 3 seconds.

The C3 type of ringing code is comprised of a single long burst followed by a short burst. The initial long burst is 1½ seconds long, followed by a ½ second interval, which is followed by a ½ second ring burst. The sequence is repeated after 3½ seconds.

It is believed that the C4 and C5 types of ringing codes are clear from the diagram, and need not be described further. However, the revertive ringing code (RR) is a ½ second burst which starts 1½ seconds after the beginning of the ringing cycle, and is followed by a 2½ second wait, which is followed by a ½ second ring burst. Each ½ second ring burst occurs following a 2½ second wait.

While the above general coding scheme is standarized, and is followed by the conforming switching offices, some variations do occur. For example, the SP-1 type of switching office, which is also manufactured by Northern Telecom Limited, has a C1 code which is a 2 second long ring burst, followed by a 4 second interval before it is repeated. The C2 code for the SP-1 switching office is comprised of 1½ second ring burst, followed by a ½ second interval, and a second 1½ second ring burst. While the C2 format is followed, clearly the time of the long ring bursts are longer than the corresponding ones generated in the SF-1 switching office, and the intervening silent period between bursts, and the silent time between repeats of the sequence are shorter. These types of seemingly minor, but electrically significant variations occur frequently with different kinds of switching offices, and have made automatic decoding difficult.

Figure 2:
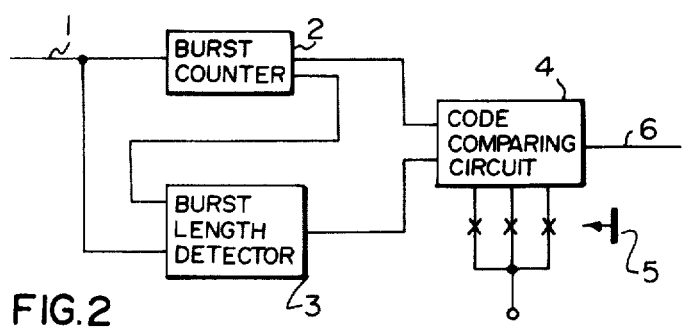

FIG. 2 shows the ringing code decoding invention in block form in its most general form. The various ringing codes are applied via input 1 to both a burst counter 2 and burst length detector 3. The outputs of both the burst counter and burst length detector are applied to inputs of a code comparing circuit 4. A plurality of code designation switches 5 is connected to the code comparing circuit. Output 6 of the code comparing circuit 4 is provided to carry a designation that a code has been received which has been predesignated by the code designation switches.

In operation, the sequence of ring bursts is applied to burst counter 2, which counts the number of ring bursts, and applies the result to the input of code comparing circuit 4. It also designates the end of the sequence to pulse length detector 3.

The ring bursts are also applied to the pulse length detector 3, which detects whether the last ring burst exceeds or is shorter than a predesignated time, in order to distinguish whether the ring burst is of short or long duration.

Once the end of sequence has been indicated to the burst length detector 3 a resulting signal at its output is an indication to the code comparing circuit that the last burst of ringing within the first sequence is of long or short duration.

The code comparing circuit thus receives an indication of the number of ring bursts in a coded ringing sequence, and also an indication of whether the last burst is of long or short duration. Predetermined ones of code designation switches 5 are closed when the apparatus is installed on a particular dedicated portion of the subscribers line, to establish the particular code associated with the subscriber. The code comparing circuit 4 compares the number of ring bursts and the relative length of the final burst with the predesignated code, and if it finds a match, provides an indication signal on the output 6 that the received ringing code is intended for the local subscriber.

External circuitry which does not form part of this invention may now connect the subscriber's line to the local telephone set, allowing further ringing to pass through to the telephone set ringer. The subscriber, in hearing the ringing, now need not mentally decode the ringing code, but can answer the telephone as soon as he hears the ringing.

Figure 3:
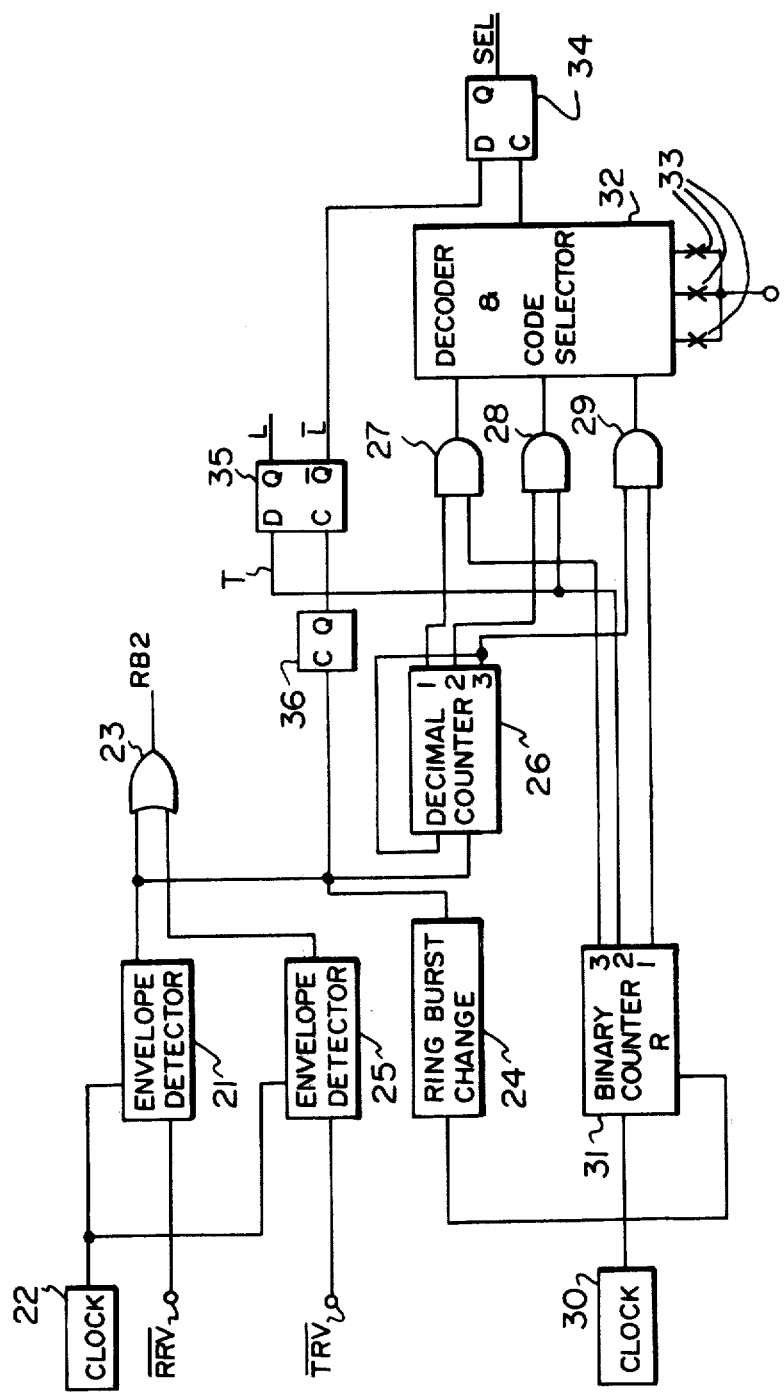

Turning now to FIG. 3, key elements of the preferred form of the inventive circuit are shown to illustrate the principle of operation. Both the structure and operation will be described simultaneously below.

The ringing voltage from the ring lead is applied to the $\overline{RRV}$ lead, having been previously converted by other well known circuitry to square wave pulses at the ringing frequency, e.g. 20 hertz. The ringing pulses appear in groups of ring bursts, and the signal is applied to envelope detection circuit 21. Also connected to the envelope detection circuit 21 is the output signal of a synchronization clock 22.

The envelope detection circuit 21 is adapted to react after a predetermined period, such as 6 milliseconds, to ensure that the incoming signal is not a noise pulse, a transient, or the like. The envelope detection circuit 21 generates an output signal which is a 100% duty cycle representative of the input signal for valid input signals. For example, where a 20 hertz input pulse signal is applied from the $\overline{RRV}$ lead with approximately 50% duty cycle, the envelope detection circuit, after its initial reaction delay, spreads the 50% duty cycle pulse to 100% at the 20 hertz frequency. If there is a dropout of the signal following the first cycle, the period of the resulting signal will only be as long as the dropout. However if there is no dropout, the envelope detection circuit bridges the period to the next cycle, until the entire ring burst has been bridged. The envelope continues for the remainder of the bridging time.

The envelope detection circuit is also adapted to operate with adaptive bridging; after the first three ringing frequency cycles have been successfully bridged and received, the bridging period extends to a minimum of 150% of the ringing cycle. In case of a dropout following for example three successive successful ringing cycles, the envelope detection circuit will not produce an output dropout of the pulse signal if there is a fault in the ringing signal within the delay period.

For a 20 hertz signal, the ringing cycle is 50 milliseconds, with a pulse time of approximately 25 milliseconds. In order to extend to a 100% duty cycle, it is preferred that the envelope detection circuit should initially delay the pulse to 62 milliseconds, i.e., the entire pulse, rather than being 25 milliseconds or 50% duty cycle, will extend to 62 milliseconds, which is somewhat in excess of the 50 millisecond cycle time. The excessive pulse delay is preferred in order to take care of various timing inaccuracies of the ringing generator equipment from the central office, and to ensure that bridging to the next ringing pulse occurs with certainty (after the initial 6 millisecond delay). In this manner the ringing burst envelopes are built up, but in case of a dropout which exceeds, initially, 62 milliseconds, a shortened ring burst pulse period occurs.

Envelope detector circuit 21 is also adapted to increase the pulse delay period preferably to 185 milliseconds following the initial three cycle delay, each of about 62 milliseconds from the beginning of each ring pulse. This allows dropouts to occur as long as 185 milliseconds before the ring burst envelope is terminated.

Assuming that the resulting ring burst envelope is not terminated, an output signal is applied to one input of OR gate 23, which indicates at its output RB2 that a valid ring burst signal has been received.

If the ringing signal appears on the tip lead, it is applied to the $\overline{TRV}$ lead, which is connected to the input of envelope detector circuit 25, the latter being similar to envelope delay circuit 21. In addition, synchronization clock 22 is applied to envelope detector circuit 25 in a similar manner as to envelope delay circuit 21. Envelope detector circuit 25 also operates in a similar manner as envelope detector circuit 21, and provides an output signal indicating reception of a valid ringing envelope, to a second input of OR gate 23. Also an output of envelope detector circuit 25 is applied to the second input of AND gate 25.

In the event of a ringing signal appearing on the tip lead, envelope detector circuit 25 causes OR gate 23 to provide an output signal on the RB2 lead, indicating that a ring burst signal is present, and that any external circuitry which is connected to the subscriber's line which might allow the line to be seized should be busied out, disconnected, or otherwise respond if required to the ringing signal. The signals on the RB2 lead is useful for external circuitry such as circuitry to busy out the line and inhibit the seizing of the line during the ringing, which circuitry does not form part of the present invention.

The ring burst envelopes are applied to decimal counter 26 from the output of either envelope detector 21 or 25. Each burst envelope results in an output pulse provided on the first, second, third, etc. output leads in succession. The first, second, and third output leads are each connected to a corresponding input of AND gates 27, 28 and 29, and the third lead is connected to a count disable input of counter 26.

A clock 30 has its output connected to the input of binary counter 31. Binary counter 31 produces a long pulse length or period of, for example 1½ seconds on its third output, a pulse length of one half the long pulse period, or ¾ seconds on its second output, and a signal having a pulse length of ½ the second output, or ⅜ seconds on the first output lead. The first output lead is connected to a second input of AND gate 27, the second output is connected to the second input of AND gate 28, and the third output lead is connected to the second input of AND gate 29. The output of AND gates 27, 28 and 29 are connected to decoder and code selector 32.

The output of the envelope detection circuitry 21 is connected to a ring burst change indication circuit 221, which has its output connected to the reset input of binary counter 31.

The present circuitry operates to determine at what point in time the end of the ring burst signal sequence occurs, with decreasing waiting time following successive ring bursts.

The ring burst envelope signals are applied to the input of decimal counter 26 and are counted therein. With each ring burst signal, outputs 1, 2 and 3 successively go to high level, each remaining at high level until the next ring burst is received and the next output goes to high level.

Accordingly, as each ring burst is received, one input of each of AND gates 27, 28 and 29 go to high level successively.

The ring burst envelope output signal of envelope detection circuit 21 is also applied to ring burst change circuit 221, which applies pulses in synchronism with the ringing envelope to the reset input of binary counter 31. When this signal goes to low level, the binary counter is released and begins counting. Since the reset signal goes to low level between ring burst envelope pulses, it is clear that binary counter is allowed to count during the interval between ring bursts. Clock 30 drives binary counter 31.

Output 3 of binary counter 31 carries 1½ second pulses, output 2 carries pulses of 1½ this time, or ¾ seconds, and output 1 carries ⅜ second pulses.

As an example of operation, consider the case in which two long ring bursts are sent, as in the C2 form of ringing (FIG. 1). The two long pulses are separated by a one second interval.

The decimal counter receives the first long ring burst from the envelope detection circuit 21. When it has received the first burst, a high level potential is applied to output 1 of decimal counter 26, and appears continuously a one input of AND gate 27.

Ring burst change circuit 221 applies a high level input to the reset input of binary counter 31 at every ring burst envelope transition. Once each of the reset pulses has been completed, the binary counter begins counting, outputting 1½ second pulses at 1½ second intervals from output 3, ¾ second pulses at ¾ second intervals at output 2, and ⅜ second pulses with ⅜ second intervals at output 1. The pulses are at low level with respect to the normal high level off state at the respective binary counter outputs.

Let us consider as an example of operation the case of a C2 ringing code (FIG. 1) that is, two one second ring bursts separated by one second off. The two ring burst envelopes are applied to the input of decimal counter 26. Accordingly, output 1 goes to high level once it has received the first input pulse, and goes to low level once decimal counter 26 receives the leading edge of the second ring burst envelope. At that time, the second output of decimal counter 26 goes to high level and remains at that level since a third ring burst pulse envelope is not received.

At the first transition point of the first ring burst, the binary counter begins to count, and is reset at each subsequent transition point. Therefore output 3 goes to low level for, it is intended, 1½ seconds. However, at the 1 second point, the binary counter 31 is reset, and output 3 again begins its timing of a 1½ second low level pulse. At the leading edge of the second ring burst, that is, 1 second later, the binary counter 31 is reset, and again the 1½ second timing at low level occurs. 1 second later, at the end of the second ring burst, there is a further reset of binary counter 31, and a 1½ second low level pulse begins timing.

However, there are no further ring bursts received, and consequently the entire 1½ second pulse is provided on output 3 of binary counter 31, following which that output goes to high level.

Output 3 of binary counter 31 and output 1 of decimal counter 26 are both connected to inputs of AND gate 27. Since the high level state of output 3 of binary counter 26 is present only when the third output of binary counter 31 is at low level, and since the high level of the third output of binary counter 31 is present only when the first output of decimal counter 26 is at low level, the inputs of AND gates 27 are not at high level simultaneously, and consequently the output of AND gate 27 remains at low level.

The second output of binary counter 26 goes to high level at the leading edge of the second ring burst envelope, which occurs 2 seconds after the leading edge of the first ring burst envelope. At the leading edge of the first ring burst envelope, the second output of binary counter 31 goes to low level, for a period of ¾ second. It then returns to high level for, what would otherwise be expected to be ¾ second. However, the trailing edge of the first ring burst envelope is received ¼ second later, causing a reset pulse to be applied to the reset input of binary counter 31. Again the second output of binary counter 31 goes to low level for a period of ¾ second, then returning to high level. One quarter second later, the leading edge of the second ring burst is received, causing binary counter 31 to be reset, and starting a further ¾ second low level pulse to be produced. It should be noted that at this time decimal counter 2 goes to high level.

Following the ¾ second pulse timing, binary counter 31 second output goes to high level. One quarter second later the trailing edge of the second ring burst envelope is received, causing binary counter 31 to be reset. The second output thereof drops to low level for a ¾ second period. Following this it returns to high level, and since no further ring burst envelopes are received, it continues to output successive high and low level pulses, each ¾ second long.

The inputs of AND gate 28 are connected to the second outputs respectively of decimal counter 26 and binary counter 31. It should be noted that high level potentials are present at both inputs following the reception of the second ring burst envelope. The first time that both inputs to AND gate 28 are high is with the ¼ second pulse of the second binary counter output first following the leading edge of the second ring burst envelope, and for ¾ second intervals beginning ¾ second after the ¼ second pulse just described, spaced by ¾ second.

Since a third ring burst envelope is never received by decimal counter 26, it does not count to three, and the third output of decimal counter 26 remains at low level. The first output of binary counter 31 begins counting ⅜ second low level pulses spaced by ⅜ seconds following reset. It is, of course, reset and begins a low level pulse following each transition of the ring burst envelope. However since both inputs of AND gate 29 never go to high level simultaneously, the output of AND gate 29 never goes to high level.

Clearly a decoding of two input pulses has occurred, and an output is generated from AND gate 28 to the decoder and code selector 32. Upon first receiving an input signal from AND gate 28, and with the previous selection of a local code designation by the closure of one or more of switches 33, when a matching of the input signal from AND gates 27, 28 and 29 occurs in the decoder 32, an output signal is applied to the clock input of flip-flop 34.

Upon finding of a match, indicating that the decoded ringing signal is intended for the local subscriber, an output signal appears from the decoder and code selector 32, is applied to the clock of flip flop 34.

With the input of a clock signal to flip flow 34, a signal is produced on the SEL lead, indicating that the local subscriber's telephone set is designated by the decoded ringing signal.

The envelope signal output of envelope detector 21 is also applied to the clock input of flip flop 35. This flip flop also has a timing lead T which causes operation of the flip flop after a predetermined period. This Q output of flip flop 35 is shown as lead L, which is at high level if the ring burst envelope is in excess of a predetermined period. Where, for example, revertive ringing pulses are to be ignored, flip flop 35 would be set so as to provide an output on the L lead when the first ringing pulse is of ½ second length. A flip flop 36 counts the first pulse and outputs it to flip flop 35. In the event the first pulse is short duration, since the revertive splash ringing is the only ringing code condition having a short first pulse, an output appears on the L̄ lead of flip flop 35. This is applied to the D input of flip flop 34, which inhibits the provision of a signal on its SEL output lead.

As a result, reception of a revertive splash ringing signal results in a "no decode" inhibition of flip flop 34, and the absence of a signal on the SEL lead.

In the above-described manner, the coded input bursts of ringing are checked for dropouts and false signals, while ring bursts are counted, and a signal signifying the count of the ring bursts is applied to a decoder and code selector for matching with a preselected code. Revertive splash ringing bursts are ignored.

Figure 4:
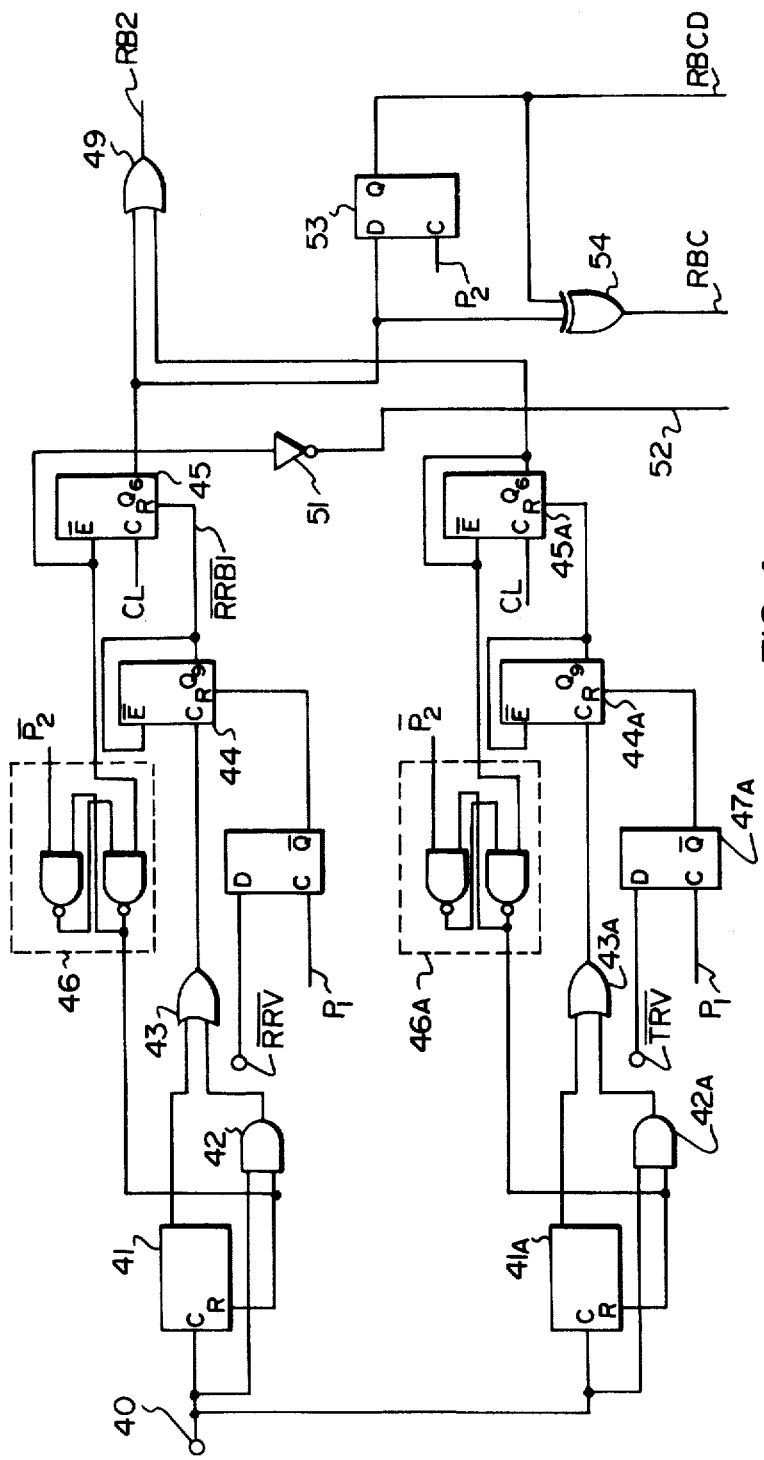
Figure 5:
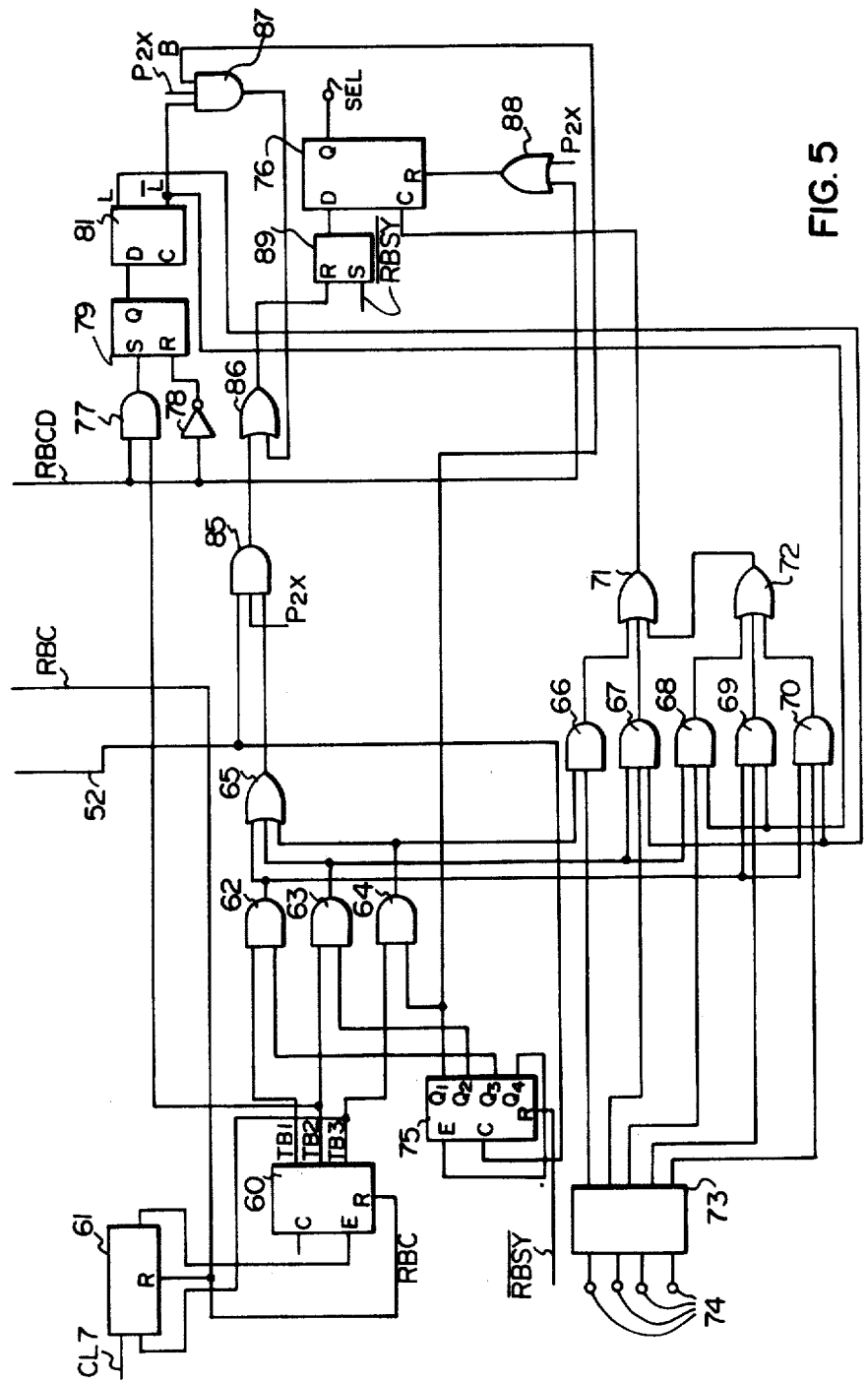

Turning now to FIGS. 4 and 5 placed together, the invention will be described in detail. A source of clock pulses is applied to terminal 40, preferably at a 6.84 millisecond pulse rate. The clock pulses are carried to the clock input of divider 41 which is preferably a programmable divider set to divide the clock frequency by 3. The clock pulses are also applied to one input of AND gate 42. The output of divider 41 is connected to one input of OR gate 43, which has its other input connected to the output of AND gate 42. The output of OR gate 43 is connected to the clock input of a resettable decimal counter 44, which is adapted to count to 9, then have its output stay at high level until it is reset by an input to its reset input R.

The 9th count output Q9 of counter 44 is connected to the reset input R of a second counter 45 which is adapted to count to 6 and then output a signal on its output Q6. The Q6 output is also adapted to stop counting once its count reaches the output Q6. The Q6 output is connected to the input of a bistable flip flop 46, which has its output connected to the second input of AND gate 42 and the reset input R of divider 41.

The ringing voltage, which usually is at a frequency of 20 hertz is applied to the $\overline{RRV}$ terminal, which terminal is connected to the data input D of flip flop 47. The $\overline{Q}$ output of the latter is connected to the reset input R of counter 44.

The 6.84 millisecond pulse length clock signal is applied both to divider 41, which divides the frequency by 3 and also to the first input of AND gate 42. The frequency divided clock signal is applied to OR gate 43, which applies a clock signal to counter 44. Counter 44 is adapted to divide the signal by nine, resulting in an output signal on its Q9 output, each pulse being 62 millseconds.

Figure 6:
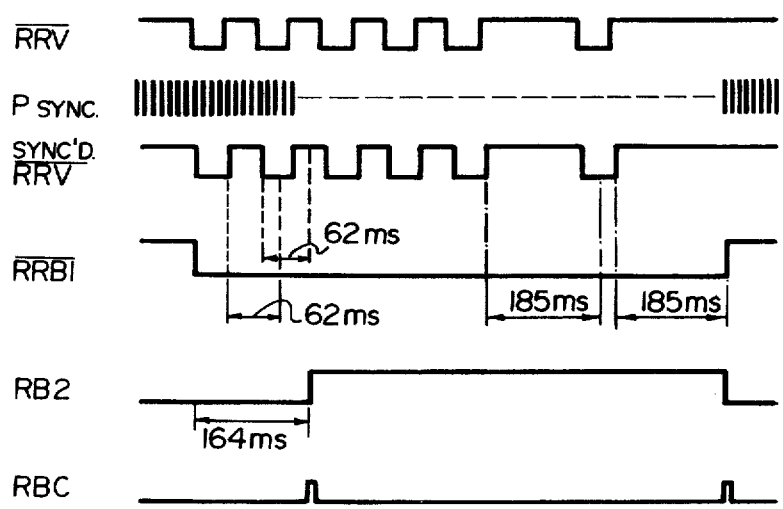

Assuming that a ringing signal (modified by external circuitry to square waves) now appears on the $\overline{RRV}$ lead, the $\overline{Q}$ output of flip flop 47 goes to low potential in sychronism therewith (but phase shifted with a clock source $P_1$). Therefore the counter 44 is allowed to count only when its reset input R is at low potential level. Since the time for counting nine input clock pulses is set at 62 milliseconds, its output remains low for that period, which is in excess of the 50 millisecond 20 hertz ringing frequency cycle time. For example, looking at FIG. 6, the input $\overline{RRV}$ signal is shown, as well as the synchronizing clock pulse $P_1$ and the resultant synchronized $\overline{RRV}$ pulses which are output from flip flop 47. The counter 44 is reset with the $\overline{Q}$ output of flip flop 47 going to high potential, and begins counting as soon as the noted $\overline{Q}$ output goes to low level. Accordingly the Q9 output lead, labelled $\overline{RRB1}$ goes to low level at the beginning of the $\overline{RRV}$ pulse, and counter 44 begins counting as soon as its reset input R goes to low level. The 62 millisecond delay is shown which overlaps the beginning of the following cycle. Accordingly the output signal on the $\overline{RRB1}$ lead goes to low level and stays there as long as there is no drop out of the $\overline{RRV}$ signal which is in excess of 62 milliseconds.

Since the synchronized $\overline{RRV}$ signal is at low level at the beginning of the second cycle, a second 62 millisecond period begins with counter 44 again counting due to the resetting thereof with the initiation of another synchronized $\overline{RRV}$ pulse to the reset input of the counter 44, and the resulting $\overline{RRB1}$ signal remains low.

The $\overline{RRB1}$ signal is applied to the reset input of counter 45, which begins counting as soon as the $\overline{RRB1}$ signal goes to low level. The timing of the count to 6 is preferred to be 164 milliseconds to provide a guard time as will be described below. In other words, once the $\overline{RRB1}$ signal has gone to low level, counter 45 begins to count clock pulses which are input thereto, taking a time of 164 milliseconds, after which its Q6 output goes to high level and remains there. This output is applied to flip flop 46, which applies an output to the second input of AND gate 42. At that time, due to the low level output from flip flop 46, AND gate 42 stops outputting clock pulses to OR gate 43, and only the clock pulses arriving from divider 41 are passed through OR gate 43. The effective count rate in counter 44 thus slows to ⅓ of the previous rate.

In summary, previously decimal counter 44 had counted the 6.84 millisecond period clock pulses up to a count of nine, for a total period of 6.84 × 9 = 61.56 milliseconds (approximately 62 milliseconds). After the count to 6 by counter 45 of its own clock input, cutting off the flow of clock pulses through AND gate 42, the clock rate applied to counter 44 is divided by three, which causes the count to 9 to take about 185 milliseconds.

Accordingly after 164 milliseconds from the beginning of the $\overline{RRV}$ pulse, the pulse retention time during which dropouts of the synchronized $\overline{RRV}$ can occur changes to 185 milliseconds. This becomes an effective timing adaptation of the circuit as it becomes more certain that the received signal is in fact a valid ringing signal.

The six count output of counter 45 is applied to OR gate 49, which provides an output signal on its output RB2 lead. The RB2 signal provides an indication to external circuitry that a valid ring burst is present and has existed for at least three ringing cycles. External ring burst detection circuitry can thereby be adapted to adjust its amplitude sensitivity threshold to ringing pulses, with decreasing sensitivity after, for example, valid ringing cycles in a ring burst has been received.

It should also be noted that the output signal on output terminal Q6 of counter 45 is effectively the envelope of the input ring burst synchronized with the system clock, and delayed 164 milliseconds to start, and delayed 185 milliseconds to its end. The burst envelope appears on the RB2 lead.

A similar circuit as that noted above is provided for sensing the presence of ringing signals on the tip lead. Divider circuit 41A has its clock input C connected to clock terminal 40, and its output connected to OR gate 43A. The clock terminal 40 is also connected to one input of AND gate 42A. The output of OR gate 43A is connected to the clock terminal of decimal counter 44A which has its 9 count output Q9 connected to the reset input of counter 45A. The 6 count output Q6 of decimal counter 45A is connected to the data input of flip flop 46A, which has its output connected to the second input of AND gate 42A, and also to the reset input R of divider 41A.

Terminal $\overline{TRV}$ is provided for the application of ringing frequency pulses thereto, and is connected to the D input D of flip flop 47A, which has a clock source $P_1$ connected thereto as well. The $\overline{Q}$ output of flip flop 47A is connected to the reset input R of counter 44A.

The 6 count output Q6 of counter 45 is connected to a second input of OR gate 49.

The last-described circuit operates similarly to the one described earlier relating to the ringing signals on the ring lead. As a result, signals on either of the tip or ring leads provide an output on the RB2 lead which follows the ring burst envelopes, and which provides to external circuitry, if required, an indication that valid ring bursts are present. Seizure of the tip and ring leads by the local subscriber during this period can thus be avoided by external circuitry which does not form part of this invention.

Assuming that ring lead ringing signals are received, the ring burst envelope signal output on the 6 count output lead Q6 of counter 45 is applied through inverter 51, and is thus available on lead 52 for further processing. The output signal of counter 45 is also applied both to one input of EXCLUSIVE OR gate 54 and to the data input D of flip flop 53. The Q output of flip flop 53 is connected to the second input of EXCLUSIVE OR gate 54. The output lead of EXCLUSIVE OR gate 54 is labelled as the RBC (ring burst change) lead.

The clock input C of flip flop 53 is connected to a clock source P2, and the flip flop is adapted to provide an output pulse corresponding to the data input signal which is delayed by a short period. Thus with the ring burst envelope and the ring burst envelope delayed applied to the two inputs of EXCLUSIVE OR gate 54, the output signal on RBC lead is a sequence of pulses having a time of the delay between the ring burst signal and the delay ring burst signal. Accordingly, every time there is a transition in the ring burst envelope, a pulse appears on the RBC lead.

Turning now to FIG. 5, the RBC lead is connected to the reset input of binary counter 60. A source of clock pulses CL7 is connected to the input of a divider circuit 61, the output of which is connected to the signal input of binary counter 60. The RBD lead is also connected to the reset input of divider 61.

The output leads of binary counter 60 are shown labelled as TB1, TB2, and TB3. The counter is preferably adapted to provide 1½ second output pulses each separated by 1½ seconds on the TB3 lead, at half the rate, or ¾ second on the TB2 lead, and half of this rate, at ⅜ second on the TB1 lead. Individual ones of this lead is connected, and the aforenoted signals are applied respectively to AND gates 62, 63 and 64. The outputs of each of the AND gates is connected to individual inputs of OR gate 65, and to a code matching circuit as follows. The output of AND gate 64 is connected to one input of each of AND gate 66, the output of AND gate 63 is connected to one input of AND gates 67 and 68, and the output of AND gate 62 is connected to one input of each of AND gates 69 and 70. The outputs of AND gates 66, 67, 68, 69 and 70 are ORed together by applying them to the inputs of OR gates 71 and 72, the output of OR gate 72 being connected to one of the inputs of OR gate 71.

A binary to decimal converter 73 has individual outputs connected respectively to one of the inputs of each of AND gates 66, 67, 68, 69 and 70. Inputs 74 of the binary to decimal converter 73 are externally connected to a set of binary switches (not shown) for switching the inputs to a set potential level, for manually setting the ring burst selection code for the present circuit. Each circuit connected to a party line thus can be set to a different code.

Decimal counter 75, for counting the received ring burst envelopes, has outputs Q1, Q2, Q3 and Q4, in which output Q4 is connected internally to the E input to stop the counting should a fourth ring burst be received. The clock input of ring burst counter 75 is connected to lead 52 which carries the ring burst envelope, thus adapting the counter to count ring bursts, the count being incremented at the end of each ring burst. The first count output Q1 of ring burst counter 75 is connected to the second input of AND gate 64 which has its first input connected to output TB3 of binary counter 60, the second count output Q2 of ring burst counter 75 is connected to the second input of AND gate 63 which has its other input connected to output TB2 of binary counter 60, and the third count output Q3 of ring burst counter 75 is connected to the second input of AND gate 62, which has its other input connected to output TB1 of binary counter 60.

For an understanding of operation of the circuit, consider the forms of ringing code shown in FIG. 1, the envelope of one of which will be carried on the lead 52 as described earlier and applied to the clock input of ring burst counter 75. The preferred embodiment of the circuit is designed to count a maximum of three ring bursts, since the ring burst code in most ringing machines is standardized at having not more than three ring bursts in a ringing code (although other numbers of ring bursts can be used by allowing counter 75 to count to a different number). Upon the arrival of the first ring burst (of whatever length) the Q1 output goes to high potential level; with the arrival of the second ring burst the Q1 output goes to low potential and the Q2 output goes to high potential, and with the arrival of the third ring burst, the Q3 output goes to high potential level and the Q2 output goes to low potential level. Accordingly each succeeding ring burst provides successive high level inputs first to AND gate 64, then to AND gate 63, and lastly to AND gate 62. It should be noted that only one of gates 62, 63 or 64 is enabled from counter 75 at a time.

In the meantime, binary counter 60 is caused to operate from clock divider 61, counting 1½ second pulses on its TB3 lead, ¾ second pulses on its TB2 lead and ⅜ second pulses on its TB1 lead. AND gates 62, 63 and 64 are enabled accordingly. It should be noted that AND gates 62, 63 and 64 correspond to AND gates 64, 63 and 62 respectively, and operate similarly as from decimal counter 26 and binary counter 31 (FIG. 4).

The output signals from AND gates 62, 63 and 64 are applied to AND gates 66, 67, 68, 69 and 70 as described earlier. The second input to each of the latter AND gates is provided from the coding switches converted to decimal decimal converter 73. Closure of coding switches results in high level on output leads of converter 73. A third input to AND gates 67, 68, 69 and 70 is provided from a pair of leads to be described later.

It may be seen that with coincidence of one of the output signals of one of gates 62, 63 and 64 and one of a preselected code signal from decoder 73 and one of the noted third inputs in one of AND gates 66-70, the output signal from one of the gates 66-70 is applied to OR gates 71 and 72, and the output signal from OR gates 71 and 72 is further applied to the clock input of a flip flop 76. Flip flop 76 provides an output signal on the SEL lead, which indicates reception of a ringing code matching the code indicated on the switches connected to the inputs 74 of converter 73. The high level delayed ring burst signal which is output from flip flop 53 (FIG. 5) is applied to one input of AND gate 77 with the ¾ second low level pulse output signal of the TB2 output lead of binary counter 60. After each ¾ second pulse the TB2 lead goes to high level, and AND gate 77 provides a high level output when the delayed ring burst is longer than ¾ of a second. This distinguishes short ring bursts from long ring bursts, since short ring bursts are approximately ½ second long (shorter than the period of the pulse on the TB2 lead), and long ring bursts are a minimum of 1 second long.

The delayed ring burst signal on the RB2 lead is also inverted in inverter 78, and applied to the reset input of flip flop 79. The output of AND gate 77 is connected to the SET input of flip flop 79. The Q output of flip flop 79 is connected to the data input of bistable multivibrator 81, which has a pair of outputs L and $\overline{L}$. The L lead goes to high level should the ring burst which is received be of duration longer than $\frac{3}{8}$ of a second, and the $\overline{L}$ output is at high level should the ring burst be less than $\frac{3}{8}$ of a second, e.g., $\frac{1}{8}$ second. The L lead is connected to AND gates 67 and 70, and the $\overline{L}$ lead is connected to AND gates 68 and 69. Accordingly whether the ringing pulse is of long or short duration determines whether AND gates 68 and 69 or 67 and 70 are enabled, out of the groups of gates 67 and 68, or gates 68 and 69 which are respectively enabled from AND gates 62 and 63.

The circuit has thus counted the number of ring bursts received and has indicated whether the last ring burst received is of long or short duration.

If any of the $1\frac{1}{2}$ second, $\frac{3}{4}$ second or $\frac{3}{8}$ second pulse provides described earlier is exceeded before another ring burst count is received, the end of the ring burst sequence has occurred. The particular ring burst count, coupled with the input of either a long or short burst indication to the decoding circuitry AND gates 67, 68, 69 and 70 via leads $\overline{L}$ or L, provides an output indication as to the count and length of the last ring burst for matching with the preselected code at the end of the ring burst sequence. As a result a signal on the SEL lead is generated.

It was noted earlier that a pulse is applied to on the RBC lead each time the ring burst either starts or finishes. The RBC lead is connected to the reset input of binary counter 60, which sets the count to zero each time there is a ring burst started or completed.

The outputs of AND gates 62, 63 and 64 are each connected to corresponding inputs of OR gate 65. With an output signal from OR gate 65, there is an indication that counting of ring bursts is occurring. This signal is at high level during the pauses between ring bursts. This output is connected to one of the inputs of AND gate 85, which has a further input to the lead 52 carrying the ring burst envelope, and to a clock $P_{2x}$. The output of AND gate 85 is connected to one input of OR gate 86, which has a second input connected to the output of AND gate 87 which has one of its inputs connected to the $\overline{L}$ lead of flip flop 81. Another input to AND gate 87 is connected to the Q1 output of binary counter 75, and a further input is connected to clock source $P_{2x}$. The output of OR gate 86 is connected to the reset input of flip flop 89, the set input of which is connected to a $\overline{RBSY}$ lead. The output of flip flop 89 is connected to the data input D of flip flop 76.

Further, the ring burst delayed output Q of flip flop 53 (FIG. 5) is connected through OR gate 88 (which has a second input connected to a clock source $P_{2x}$), which has its output connected to the reset input of flip flop 76.

With the output of a pulse signal from OR gate 65 occurring, indicating that the end of a sequence of pulses has occurred, an output signal from AND gate 85 occurs in synchronism with clock source $P_{2x}$, and with the presence of a high level signal on lead 52. The latter condition indicates that ringing is occurring, in order to guarantee that an output on the SEL lead from flip flop 76 does not occur with ringing voltage present. An output signal from AND gate 85 is applied to OR gate 86 is generated, conditioning flip flop 76 to apply a signal on the SEL lead upon receipt of a signal in the clock C input from the output of OR gate 71, indicating a matched code receipt.

It should be noted that the signal applied to the clock input of flip flop 76 is in phase with clock $P_1$, while the signal applied to the reset input of flip flop 76 is the delayed ringing signal (from flip flop 53) in phase with clock $P_{2x}$. Accordingly, the signal on the SEL lead occurs as pulses during the time differential between the sources $P_1$ and $P_2$.

OR gate 86 will also operate from the output of AND gate 87. AND gate 87 is activated upon reception of a short pulse (causing a signal on the $\overline{L}$ lead of flip flop 81, and a high level signal exceeding the low level pulse time on output lead Q1 of binary counter 75. The output of AND gate 87 thus provides an indication that short interval pulses are being received with large waiting times between, which is an indication of revertive ringing being received. Since no matching code will have been received causing a signal to be applied to the clock input of flip flop 76, no signal output on the SEL lead is generated.

The above described circuit thus has provided means for counting ring bursts, for determining when the end of a sequence of ring bursts has occurred, and for establishing whether the last ring burst is relative long or short. Further, the circuitry for determining the end of the ring burst sequence is adaptive, in that it waits for progressively shorter periods as the number of ring bursts increases to determine that an end of the ring burst sequence has occurred. Means is also provided to ignore revertive ringing bursts. Upon the reception of a code which matches a preselected code for the subject circuits, a signal is applied to an SEL lead, which indicates to external circuitry that a ringing code sequence has been received by the local subscriber.

A person understanding this invention may now conceive of various modifications or other embodiments. All are considered within the sphere and scope of the invention as defined in the claims appended hereto.

I claim:
1. A ringing decoder circuit for decoding coded ringing signals comprising at least one sequence of long and/or shot bursts of ringing signals, comprising:
 (a) means for counting the total number of bursts in a sequence,
 (b) means for detecting the length of the final burst in the sequence relative to a first predetermined interval, and
 (c) means for indicating the reception of a predetermined code in the event the number of bursts and the relative length of the final burst in the sequence match a predetermined indicated number and relative length respectively.

2. A ringing decoder circuit as defined in claim 1, including means for measuring the period of time following the end of each ring burst, and for indicating the termination of the sequence in the event said period of time exceeds a first predetermined period.

3. A ringing decoder circuit as defined in claim 2, in which the first predetermined period is modified following each counted ring burst in a sequence.

4. A ringing decoder circuit as defined in claim 2, in which the first predetermined period is reduced following each counted ring burst in a sequence.

5. A ringing decoder as defined in claim 4 in which the first predetermined period is about $1\frac{1}{2}$ seconds, and each subsequent predetermined period is reduced by one-half from the preceding first predetermined period.

6. A ringing decoder circuit as defined in claim 1, 3 or 4, including further means for detecting the presence of the first ring burst in the sequence as a burst of ringing which is shorter than a second predetermined interval, and for ignoring it and following ring bursts for a predetermined time if said shorter ring burst is detected.

7. A ringing decoder for decoding coded ringing signals comprising repetitive sequences of long and short bursts of ringing signal comprising:
(a) means for converting the ringing signals into pulse signals at the ringing frequency,
(b) means for lengthening each pulse of said pulse signals to a 100% duty cycle at the ringing frequency, so as to form a ringing signal burst envelope,
(c) means for counting the total number of burst envelopes in a first code sequence of ring bursts,
(d) means for detecting the length of the final burst in said sequence as being in excess of or less than a predetermined time period, and
(e) means for indicating the reception of a predetermined ringing code in the event the number of bursts and the length of the final burst in said first sequence respectively match a predetermined number and predetermined length thereof.

8. A ringing decoder as defined in claim 7, in which the means for lengthening each pulse includes means for lengthening the time of each ringing pulse following a first minimum number of cycles in the first burst of ringing signals for a time period which is a multiple of a ringing cycle period.

9. A ringing decoder as defined in claim 8, further including means for measuring the period following the end of each ring burst envelope relative to a first predetermined period, and for indicating the completion of the first sequence in the event the period is in excess of the first predetermined period.

10. A ringing decoder as defined in claim 9, in which the first predetermined period is reduced following each ring burst in the sequence.

11. A ringing decoder as defined in claim 7 or 10, further including means for timing the first ring burst in a sequence and for not counting it in the event its time is less than a predetermined multiple of a ringing cycle time.

12. A ringing decoder as defined in claim 11, including a means adapted to provide output pulses of the form of said ring burst envelopes, first counter means for counting each said output pulse and for providing a corresponding count pulse on successive ones of a plurality of count leads, and timing signal generating means, adapted to provide individual output signals of opposite polarity to the count pulses, one having a cycle time greater than the maximum expected time between ring bursts within a sequence but less than the minimum time between the end of one ring burst sequence and the beginning of the next, a second having a cycle time of less than the cycle time of the first individual output signal, and a third having a cycle time of less than the cycle time of the second individual output less than the cycle time of the second individual output signal; means for resetting the timing signal generating means with each transition of the ring burst envelopes; means for applying the first count pulse to a first AND gate with the first individual output signal, means for applying the second count pulse to a second AND gate with the second individual output signal and means for applying the third count pulse to a third AND gate with the third individual output signal; and means for comparing the signal outputs of the AND gates with preselected code signal and for indicating the reception of a predetermined ringing code upon coincidence thereof.

13. A ringing decoder as defined in claim 12 further including timing means for providing a signal indicating that the last ring burst envelope received is either long or short relative to a predetermined time period, and an output signal generating means adapted to provide an output pulse in the event that the predetermined ringing code and the relative length of the last ring burst received match said predetermined ringing code and a predetermined relative length of last ring burst.

14. A ringing decoder as defined in claim 13, in which the first counter means is a decimal counter and the timing signal generator is a binary counter; said means for resetting is comprised of means for receiving ring burst envelope signals and for generating a pulse with each transition of the ring burst envelope, means for applying the latter pulse to a reset input of the binary counter, and a source of clock signals for driving the binary counter.

* * * * *